(12) United States Patent
Li et al.

(10) Patent No.: US 11,923,602 B2
(45) Date of Patent: Mar. 5, 2024

(54) OUTDOOR CUSTOMER PREMISES EQUIPMENT

(71) Applicant: XI'AN ZHONGXING NEW SOFTWARE CO., LTD., Xi'an (CN)

(72) Inventors: Yan Li, Shenzhen (CN); Yigang Feng, Shenzhen (CN); Cheng Zhao, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 102 days.

(21) Appl. No.: 17/439,597

(22) PCT Filed: Jun. 24, 2020

(86) PCT No.: PCT/CN2020/098090
§ 371 (c)(1),
(2) Date: Sep. 15, 2021

(87) PCT Pub. No.: WO2021/077787
PCT Pub. Date: Apr. 29, 2021

(65) Prior Publication Data
US 2022/0149508 A1 May 12, 2022

(30) Foreign Application Priority Data

Oct. 24, 2019 (CN) .......................... 201921797369.4

(51) Int. Cl.
*H01Q 1/02* (2006.01)
*H01Q 1/24* (2006.01)
*H01Q 25/00* (2006.01)

(52) U.S. Cl.
CPC .............. *H01Q 1/246* (2013.01); *H01Q 1/02* (2013.01); *H01Q 25/002* (2013.01)

(58) Field of Classification Search
CPC ........ H01Q 1/246; H01Q 1/02; H01Q 1/1221; H01Q 25/002
See application file for complete search history.

(56) References Cited

U.S. PATENT DOCUMENTS

| 10,425,905 B1 | 9/2019 | Black et al. |
| 2019/0252776 A1 | 8/2019 | Hill et al. |

FOREIGN PATENT DOCUMENTS

| CN | 101326683 A | 12/2008 | |
| CN | 202695733 U | 1/2013 | |
| CN | 105990772 A | 10/2016 | |
| CN | 109495911 A * | 3/2019 | ............... H01Q 1/22 |

(Continued)

OTHER PUBLICATIONS

International Searching Authority. International Search Report and Written Opinion for PCT Application No. PCT/CN2020/098090, dated Sep. 29, 2020, pp. 1-12.

*Primary Examiner* — Hoang V Nguyen
(74) *Attorney, Agent, or Firm* — Vivacqua Crane, PLLC

(57) ABSTRACT

An outdoor customer premises equipment (CPE) is disclosed. The out door CPE may include: a main body which includes a printed circuit board (PCB), a heat sink, a heater assembly, a SIM card holder, a radio frequency (RF) cable and a fifth generation (5G) communication module; and an antenna module which is detachably connected to the main body and includes a cable interface connected to the RF cable, where the antenna module is a high-gain antenna module or a low-gain antenna module.

11 Claims, 4 Drawing Sheets

(56) References Cited

FOREIGN PATENT DOCUMENTS

| CN | 109660881 A | 4/2019 | |
|----|----|----|----|
| CN | 209184819 U | 7/2019 | |
| CN | 110247153 A | 9/2019 | |
| CN | 210694209 U | 6/2020 | |
| WO | WO-2019072154 A1 * | 4/2019 | ............... H01Q 1/02 |

\* cited by examiner

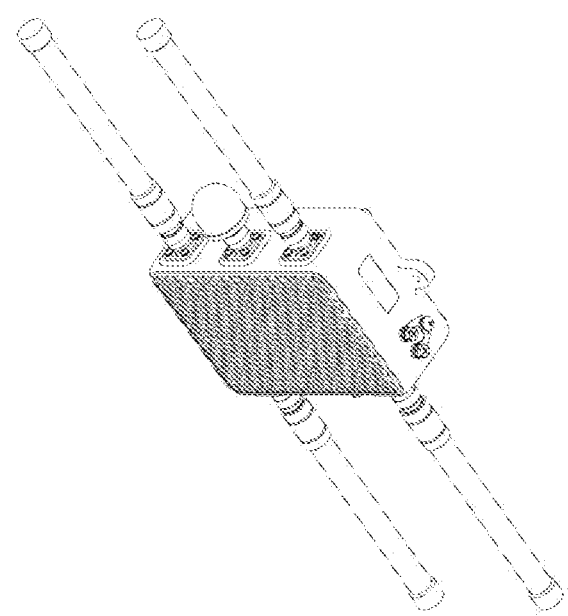
Fig. 3
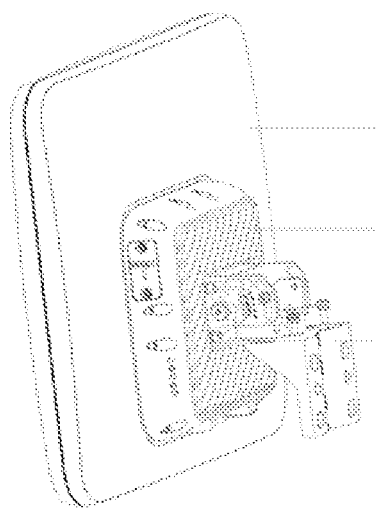
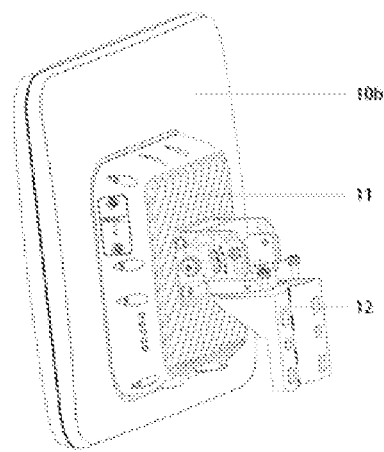
Fig. 4a   Fig. 4b

OUTDOOR CUSTOMER PREMISES EQUIPMENT

CROSS-REFERENCE TO RELATED APPLICATION

This application is a national stage filing under 35 U.S.C. § 371 of international application number PCT/CN2020/098090, filed Jun. 24, 2020, which claims priority to Chinese patent application No. 201921797369.4, filed Oct. 24, 2019. The contents of these applications are incorporated herein by reference in their entirety.

TECHNICAL FIELD

The present disclosure relates to, but is not limited to, the field of electronic technology, and in particular to an outdoor customer premises equipment (CPE) for fifth generation (5G) networks.

BACKGROUND

At present, the fourth generation (4G) networks have become commercially available on a full scale and the demand for mobile data is surging, so that the existing mobile communication systems can hardly accommodate this demand in the future. Therefore, the 5G technology has come into being. The 5G technology features high data rates, low latency, reduced energy consumption, lower costs, increased system capacities, and massive machine-type communications. The main advantage of 5G networks is that the data transmission rate is much higher than that of previous generations of cellular networks. In general, the data transmission rate of a 5G network can reach 10 Gbit/s, which is faster than the current cable Internet and 100 times as fast as a 4G LTE-Advanced cellular network. Another advantage is lower network latency and hence a faster response time. Due to the faster data transmission, the 5G networks will not only provide services for mobile phones, but also become general-purpose home and office network providers, competing with cable network providers.

Currently, the penetration rate of the 5G technology is still low and the number of base stations deployed in some countries or areas cannot meet expectations in a short term due to manpower and fiscal issues. However, the maximum transmission power of an outdoor CPE can reach 500 mW, which is much higher than that of user terminal equipment, and in addition, the outdoor CPE has built-in high-gain omnidirectional and directional antennas, which can effectively solve the problem of a power mismatch between uplink and downlink signals and ensure the effective extension of signal coverage outdoors. In this way, the last mile problem of broadband Internet access for users in such areas can be fundamentally solved.

In some countries or areas, Internet users are scattered, so the wiring may be expensive and troublesome. Using an outdoor CPE to deploy the network can realize long-distance wireless data transmission, thus saving the trouble of wiring and reducing construction costs. Operators can choose to build base stations in nearby towns that already have wired networks, with front ends accessing the operators' networks. Once the outdoor CPE (with built-in SIM cards to receive and upload data) is set up at the premises of home users or small unit users and connected to the base stations, the users can access the Internet. In addition, an indoor CPE is accessed through a network cable, so as to achieve the purpose of introducing the network into the room, enabling the operators to break through the traditional wired access mode and save operating costs.

Current outdoor CPEs are divided into the following three types:
1. Integrated type-A CPE (as shown in FIG. 1): antennas, together with a motherboard, a module, a heat sink, a heater, and other components, are installed in a housing assembled from a front housing and a rear housing, and a bracket is injection molded on a structural member or installed on the back of the housing.
2. Integrated type-B CPE (as shown in FIG. 2): antennas, together with a motherboard, a module, a heat sink, and other components, are installed in a housing in the form of a sleeve, and a bracket in the form of a base is connected to a structural member.
3. Integrated type-C CPE (as shown in FIG. 3): a motherboard, a module, a heat sink, a heater, and other components are installed in a metal housing assembled from a front housing and a rear housing, and antennas are exposed outside of the housing through interfaces.

Most of the above-mentioned commercially available CPEs are installed in quite different ways, but they all have antenna gains. As the 5G network is still at the early stage of development, there are many unknown parameters in product volumes, power consumption performance and stability of the base stations. A fixed antenna gain inside CPE means that the transmission power of the signal is fixed. However, the construction conditions for base stations vary from one area to another. In some areas, 5G base stations are densely built, so the CPE there only needs low-gain antennas. However, in areas where 5G base stations are sparse, the CPE needs high-power and high-gain antennas in order to download and upload data smoothly. The demand for the prior art 5G CPE products is constant, and once purchased by the operators, the products cannot be distributed according to specific conditions of the areas, thus increasing the costs. If the products are intended to be sold to individual home users, the products are less attractive with no alternative options provided.

SUMMARY

An embodiment of the present disclosure provides an outdoor CPE for 5G networks, which can adjust the configuration of an antenna module and a main body according to the needs of different areas, and thus can improve a signal strength and reduce operating cost to at least a certain extent.

An embodiment of the present disclosure provides an outdoor CPE, which may include at least: a main body, where the main body may include at least a printed circuit board (PCB), a heat sink, a heater assembly, a SIM card holder, a radio frequency (RF) cable and a 5G communication module. The outdoor CPE may further include an antenna module, which has a cable interface connected to the RF cable and is detachably connected to the main body, where the antenna module is a high-gain antenna module or a low-gain antenna module.

In an exemplary embodiment, the antenna module has a casing, and one end face of the casing is provided with a recess for receiving the main body in a nesting fashion.

In an exemplary embodiment, the end face of the main body for the RF cable to extend therethrough is nested inside the recess of the casing.

In an exemplary embodiment, the recess of the casing is provided with a through-hole for exposing the cable interface.

In an exemplary embodiment, the outdoor CPE may further include a connecting assembly for fixedly connecting a housing of the main body to the casing of the antenna module.

In an exemplary embodiment, an omnidirectional antenna and a directional antenna are arranged in a casing of the antenna module.

In an exemplary embodiment, the omnidirectional antenna and the directional antenna are respectively high-gain antennas.

In an exemplary embodiment, the omnidirectional antenna and the directional antenna are respectively low-gain antennas.

In an exemplary embodiment, the outdoor CPE may further include a watertight sealing strip arranged at a joint between the antenna module and the main body.

In an exemplary embodiment, the outdoor CPE may further include a fixing bracket detachably connected to the main body.

BRIEF DESCRIPTION OF DRAWINGS

FIG. 3 is a schematic diagram of the structure of an integrated type-C CPE in the prior art;

FIG. 4a is a schematic diagram of the structure of an outdoor CPE with a high-gain antenna according to an embodiment of the present disclosure;

FIG. 4b is a schematic diagram of the structure of an outdoor CPE with a low-gain antenna according to an embodiment of the present disclosure;

DETAILED DESCRIPTION

Hereinafter, preferred embodiments of the present disclosure will be described in detail with reference to the accompanying drawings. It should be understood that the preferred embodiments described below are only used to illustrate and explain the embodiments of the present disclosure, and are not intended to limit the embodiments of the present disclosure.

Figure 1:
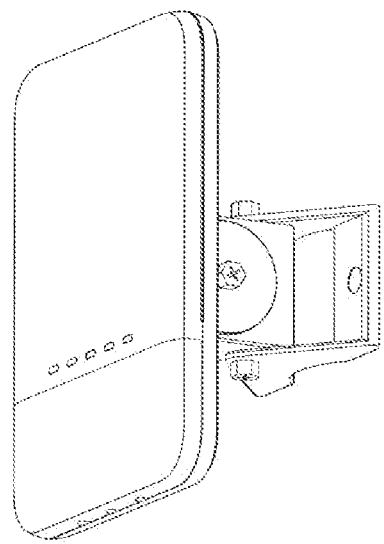
FIG. 1 is a schematic diagram of the structure of an integrated type-A CPE in the prior art.
Figure 2:
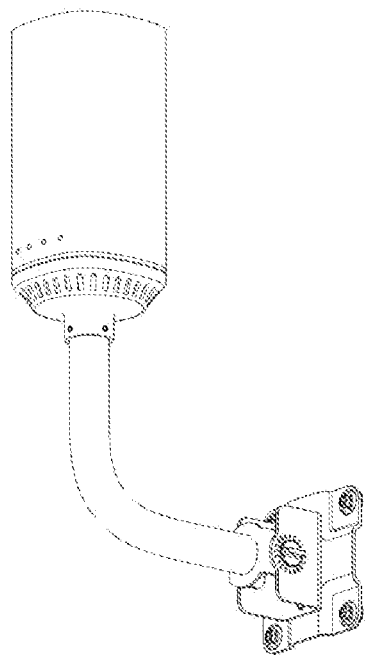
FIG. 2 is a schematic diagram of the structure of an integrated type-B CPE in the prior art.
Figure 5A:
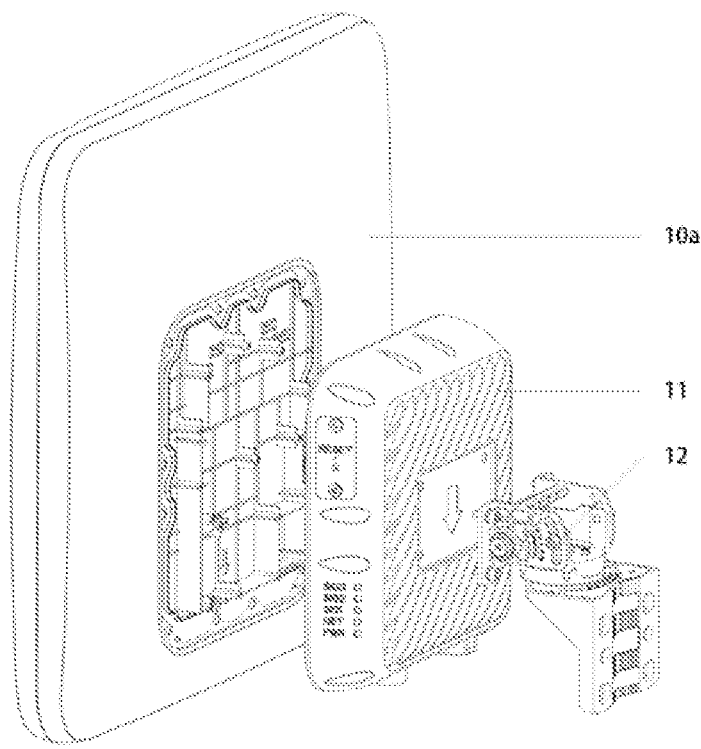
FIG. 5a is an exploded view of an outdoor CPE with a high-gain antenna according to an embodiment of the present disclosure.
Figure 5B:
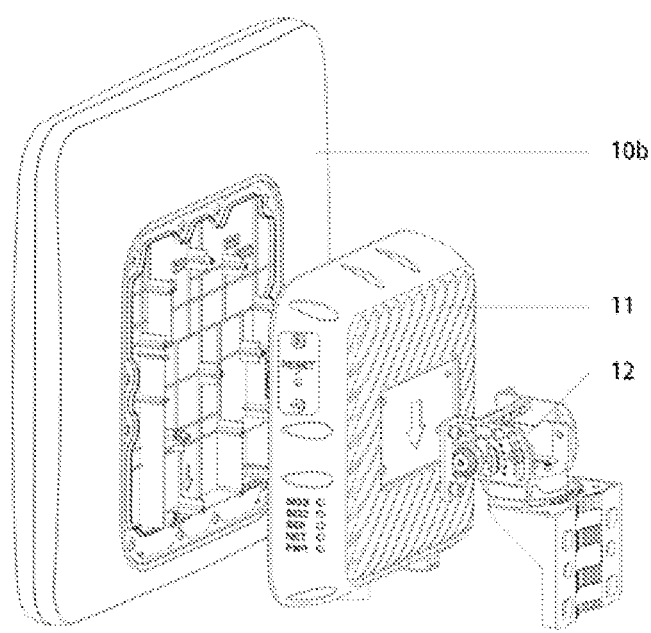
FIG. 5b is an exploded view of an outdoor CPE with a low-gain antenna according to an embodiment of the present disclosure.

An embodiment of the present disclosure provides an outdoor CPE for 5G networks, which includes at least a main body, where the main body includes at least: a PCB, a heat sink, a heater assembly, a SIM card holder, an RF cable and a 5G communication module. An embodiment of the present disclosure provides an outdoor CPE for 5G networks, which further includes an antenna module, which has a cable interface connected to the RF cable and is detachably connected to the main body, where the antenna module is a high-gain antenna module 10a (as shown in FIGS. 4a and 5a), or the antenna module is a low-gain antenna module 10b (as shown in FIGS. 4b and 5b).

In the outdoor CPE of the present disclosure, the antenna module and the main body are detachably connected, so that antennas with different gains can be provided according to the requirements regarding base station deployment in different areas. For example, the main body is provided with low-gain antennas in areas with densely built base stations to reduce costs, while high-gain antennas are used in areas with sparse base stations to increase transmission power. Therefore, the outdoor CPE of the present disclosure can be adapted to local conditions. In this way, the cost of the CPE can be minimized on the user side. In addition, it is also beneficial for operators to provide access to their networks, thus providing the operators with greater advantages.

In the outdoor CPE according to this embodiment, the antenna module is detachably connected to the main body, and the antenna module may be a high-gain antenna module or a low-gain antenna module, so that the same main body can be selectively equipped with antenna modules with different gains. In this way, with the main body unchanged, antenna modules with different gains can be installed according to the needs of different areas, so that the 5G outdoor CPE can be provided with signal transmission powers according to needs. The main body can be compatible with antenna modules of different sizes, while only one set of molding tools needs to be developed for the main body. Therefore, the outdoor CPE according to this embodiment can reduce the manufacturing costs and has good compatibility.

At least a PCB 16, a heat sink 14, a SIM card holder 15, an RF cable 17, a 5G communication module 18, and other components are installed in a housing of a main body 11. The installation of these components in the housing of the main body can be the same as that in the prior art and will not be detailed here. The RF cable extends outwards from the housing of the main body, and the end extending outwards is configured to be connected to an RF cable interface on the antenna module. In an exemplary embodiment, there are a plurality of RF cables 17 installed in the housing of the main body, and accordingly, there are a plurality of RF cable interfaces on the antenna module.

In an exemplary embodiment, the antenna module has a casing in which an omnidirectional antenna and a directional antenna are arranged. The omnidirectional antenna and the directional antenna each may be a high-gain antenna, or the omnidirectional antenna and the directional antenna each may be a low-gain antenna. The fixing mode of the antennas in the casing can also use the fixing mode of the prior art and will not be detailed here. During manufacturing, the size of the casing of the antenna module is determined according to different gains selected.

In order to facilitate the detachable connection between the antenna module and the main body, in this embodiment, a recess for receiving a part of the main body in a nesting fashion is formed in one end face of the casing of the antenna module, and the recess can be located in the center of the end face of the casing of the antenna module. Accordingly, the end face of the housing of the main body for the RF cable to extend therethrough is nested inside the recess of the casing of the antenna module.

The housing of the main body and the casing of the antenna module are fixedly connected to each other via a connecting assembly. The connecting assembly may be a plurality of screws. During assembly, a part of the housing of the main body is inserted into the recess of the casing of the antenna module, and then a periphery of the housing of the main body is fixed to the casing of the antenna module by the plurality of screws. Accordingly, the corresponding positions in the housing of the main body and the casing of the antenna module are respectively provided with screw holes for the screws to pass through. In addition, other detachable connection methods in the prior art can be used to connect the two according to the connection requirements.

In design, the recess in the casing of the antenna is correspondingly shaped to the part of the housing of the main body configured to be nested inside the recess, so that when the housing of the main body is inserted into the recess of the casing of the antenna module, the housing of the main body can exactly match the casing of the antenna module. For example, if a cross-section of the part of the housing of the main body configured to be nested inside the recess is rectangular, a cross-section of the recess is also rectangular; if a cross-section of the part of the housing of the main body configured to be nested inside the recess is circular, a cross-section of the recess is also circular.

In order to connect the RF cable interface of the antenna module to the RF cable of the main body, a through-hole for exposing the cable interface is also formed in the recess of the casing of the antenna module. During manufacturing, as there are a plurality of cable interfaces, a through-hole can be provided in the recess to expose all the cable interfaces, that is, a window can be provided in the center of the recess (as shown in FIGS. 5a and 5b). Alternatively, a plurality of through-holes may be provided in the recess, each through-hole corresponding to a position of a cable interface (not shown). In an exemplary embodiment, a window can be provided in the center of the recess, in which case a plurality of screw holes are located at the periphery of the window.

Figure 6:
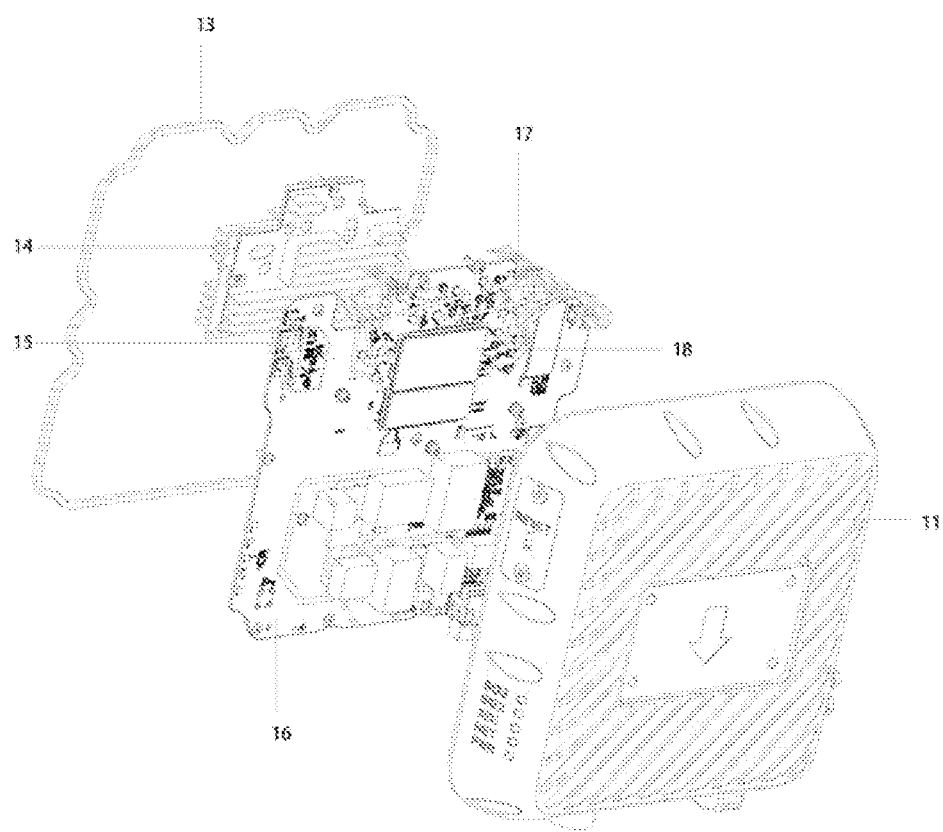
FIG. 6 is an exploded view of a main body of an embodiment of the present disclosure.

In this embodiment, in order to waterproof the joint when connecting the antenna module and the main body, a watertight sealing strip 13 is further provided at the joint between the antenna module and the main body (as shown in FIG. 6). During the design, the watertight sealing strip 13 is shaped according to the specific conditions of the joint for effective waterproof. During assembly, the watertight sealing strip 13 should be placed at peripheries of multiple cable interfaces, and if a window is provided in the recess, the watertight sealing strip 13 may be placed around the window, then RF cable of the main body is connected to the cable interface of the antenna module, and then the part of the main body is inserted into the recess. Finally, the housing of the main body and the casing of the antenna module are fixedly connected by a plurality of screws.

It should be noted that, in addition to the above structure and method, the connection between the main body and the antenna module can also use similar structures and methods in the prior art that can detachably connect two components in a watertight way, which will not be described in detail here.

Moreover, in addition to the above-mentioned main body and antenna module, the equipment of this embodiment also includes a fixing bracket 12 detachably connected to the main body (for example, by screws). The fixing bracket 12 and the antenna module are connected to two opposite end faces of the main body, respectively, and the assembled antenna module and main body are mounted on a wall or a pole via the fixing bracket 12.

After assembly, the main body and the antenna module work together under the action of the RF cable 17. Once a SIM card is inserted into the SIM card holder 15, the 5G communication module 18 may start to work.

The antenna module of this embodiment can be either the high-gain antenna module 10a or the low-gain antenna module 10b. Whichever antenna module is chosen, the antenna module can be connected via the watertight sealing strip 13 in a watertight way to the main body 11 in which the PCB 16, the heat sink 14, the SIM card holder 15, the RF cable 17, and the 5G communication module 18 are installed and then fixed by a plurality of screws. Here, the number of the screws may be determined according to actual circumstances. For example, there will be 12 screws if an arrangement of 12 screw holes as shown in FIG. 5a is employed. Finally, the equipment is fixed on a wall or a pole via the fixing bracket 12. In areas where the coverage of base stations is less and signal sources are far away from one another, the high-gain antenna module 10a can be connected to the main body 11 to increase the transmission power, while in areas with dense coverage of base stations and shorter distances between signal sources, the low-gain antenna module 10b can be connected to the main body 11 to reduce the costs. The equipment according to the embodiments of the present disclosure can be adjusted by choosing antennas with different gains according to the requirements regarding base station deployment in different areas, so as to minimize the cost of the CPE on the user side. In addition, the equipment according to the embodiments of the present disclosure is also beneficial for operators to provide access to their networks, thus providing the operators with greater advantages.

The above is the description of the preferred embodiments of the present disclosure. It should be noted that for those of ordinary skill in the art, without departing from the principles of the present disclosure, a number of improvements and embellishments can be made, and these improvements and embellishments are also regarded as included within the scope of protection of the present disclosure.

The invention claimed is:

1. An outdoor customer premises equipment (CPE), comprising:
   a main body, which comprises:
   a printed circuit board (PCB);
   a heat sink;
   a heater assembly;
   a SIM card holder;
   a radio frequency (RF) cable; and
   a fifth generation (5G) communication module; and
   an antenna module which comprises a casing and a cable interface connected to the RF cable,
   wherein the casing comprises an end face provided with a recess for receiving the main body in a nesting fashion, and the recess is provided with a through-hole for exposing the cable interface, so that the antenna module is detachably connected to the main body;
   wherein the end face of the main body is nested inside the recess of the casing of the antenna module; and
   wherein the antenna module is a high-gain antenna module or a low-gain antenna module.

2. The outdoor CPE of claim 1, wherein the main body comprises a housing, the outdoor CPE further comprises a connecting assembly for fixedly connecting the housing of the main body to the casing of the antenna module.

3. The outdoor CPE of claim 2, further comprising a watertight sealing strip arranged at a joint between the antenna module and the main body.

4. The outdoor CPE of claim 1, wherein the antenna module comprises a casing, an omnidirectional antenna and a directional antenna, the omnidirectional antenna and the directional antenna are arranged in the casing of the antenna module.

5. The outdoor CPE of claim 4, wherein the omnidirectional antenna and the directional antenna are respectively high-gain antennas.

6. The outdoor CPE of claim 5, further comprising a watertight sealing strip arranged at a joint between the antenna module and the main body.

7. The outdoor CPE of claim 4, wherein the omnidirectional antenna and the directional antenna are respectively low-gain antennas.

8. The outdoor CPE of claim 7, further comprising a watertight sealing strip arranged at a joint between the antenna module and the main body.

9. The outdoor CPE of claim 4, further comprising a watertight sealing strip arranged at a joint between the antenna module and the main body.

10. The outdoor CPE of claim 1, further comprising a watertight sealing strip arranged at a joint between the antenna module and the main body.

11. The outdoor CPE of claim 1, further comprising a fixing bracket detachably connected to the main body.

* * * * *